(12) United States Patent
Quinquis et al.

(10) Patent No.: US 6,490,258 B1
(45) Date of Patent: *Dec. 3, 2002

(54) MOBILE UNIT LOCAL ACCESS NETWORK

(76) Inventors: Jean-Paul Quinquis, Ste rue de Cornic, 22700 Perros-Guirec (FR); Oliver Roussel, 33 rue des Pont Hele, 22700 Perros-Guirec (FR); Laurent Hue, 10 avenue du Generale de Gaulle, 22300 Lannion (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/846,042

(22) Filed: Apr. 25, 1997

(51) Int. Cl.⁷ .................................................. H04Q 7/00
(52) U.S. Cl. ....................... 370/331; 370/338; 370/434; 455/436; 455/442; 455/443; 455/444
(58) Field of Search .................................. 370/331, 338, 370/349, 434, 379, 399, 409; 455/436, 437, 438, 439, 440, 441, 442, 443, 444

(56) References Cited

U.S. PATENT DOCUMENTS

| | | | |
|---|---|---|---|
| 5,265,263 A | * 11/1993 | Ramsdale et al. | 455/33.2 |
| 5,345,499 A | * 9/1994 | Benveniste | 379/59 |
| 5,590,177 A | * 12/1996 | Vilmur et al. | 379/60 |
| 5,603,083 A | * 2/1997 | Lee | 455/33.1 |

FOREIGN PATENT DOCUMENTS

| | | |
|---|---|---|
| EP | 0 426 269 A | 5/1991 |
| EP | 0 660 625 A | 6/1995 |

OTHER PUBLICATIONS

Serving Humanity Through Communications, Supercomm/ICC, New Orleans, May 1–5, 1994, vol. 1, pp. 192–196.

* cited by examiner

*Primary Examiner*—Hassan Kizou
*Assistant Examiner*—Saba Tsegaye
(74) *Attorney, Agent, or Firm*—Michael Best & Friedrich, LLC (57) ABSTRACT

This invention relates to a local access network for mobile telephone units. Each radio station in this network has an associated group of radio stations forming a predetermined macrocell. Each radio station may become the macrocell's core station. When a mobile unit leaves the coverage of one station (the "fading" station) and enters the coverage of another (the "change-over" station), virtual connections are formed to the stations covering the macrocell associated with the change over the station. At this time the virtual connections belonging to the stations in the macrocell associated with the previous station, but not belonging to the macrocell associated with the change-over station, are released.

16 Claims, 10 Drawing Sheets

| 1 | 25 | 26 | 9 | 3 | 8 | 7 | Mcell₀

| 9 | 3 | 8 | 7 | 10 | 6 | 4 | Mcell₁

Mcell₂ | 8 | 3 | 10 | 6 |   | 11 | 15 | 20 | 17 | 18 |

FIG. 9a

| 1 | 25 | 26 | 9 | 3 | 8 | 7 | Mcell₀
| 1 | 25 | 26 | 9 | 3 | 8 | 7 | 10 | 6 | 4 |
| 9 | 3 | 8 | 7 | 10 | 6 | 4 | Mcell₁
| 9 | 3 | 8 | 7 | 10 | 6 | 4 | 11 | 15 | 20 | 17 | 18 |
Mcell₂ | 8 | 7 | 10 | 6 |   | 11 | 15 | 20 | 17 | 18 |

FIG. 9b

| 1 | 25 | 26 | 9 | 3 | 8 | 7 | Mcell₀
| 1 | 25 | 26 | 9 | 3 | 8 | 7 | 11 | 14 | 15 | 16 | 17 | 27 | 28 |
                                      A↙   B↘ | 11 | 14 | 15 | 16 | 17 | 27 | 28 | Mcell₂
                                           ↙C
| 1 | 25 | 26 | 9 | 3 | 8 | 7 | Mcell₀

FIG. 9c

MOBILE UNIT LOCAL ACCESS NETWORK

This invention relates to a local access network intended for mobile units.

Some mobile unit local access networks already exist, and it may be useful to refer to patent document FR-A-2 714 559, which outlines a similar network consisting of a double bus interconnecting, for example through concentration nodes, several radio stations to which mobile stations, also called mobile units or mobiles can be connected.

In time, communications between mobile units or between a mobile and another party will not be voice only, but may require carrying representational data such as still or animated images, which will justify the use of multiflow or even wideband networks. By design, ATM (Asynchronous Transfer Mode) technology makes it possible to transfer any type of information at variable rates of transmission.

A main purpose of this invention is to offer a mobile unit local access network which supports this ATM technology.

Some mobile unit local access networks consist of a distribution network, itself comprised of several nodes connected to a concentrator, to which is connected at least one radio station to communicate with mobiles associated with this base station (RS). At least one of these nodes of the distribution network is connected, through a switching device, to a virtual channel selector.

The growing demand for communication services between mobiles has resulted in increasing traffic load, which each radio station in the local access network must be able to handle. To ensure better radio coverage of urban areas while taking into account the necessarily limited performance of these radio stations, one has to reduce the coverage of each-radio station and to offer networks based on macrocellular architectures. Nevertheless, this creates the problem of a very significant increase in signaling procedures, especially when mobiles leave the radio coverage of one station and come under the coverage of another station, in what are technically referred to as "hand-over phases." The procedures to manage the hand-over phases require some handling processes which might quickly saturate ground-based control units.

French Patent 2,714,559 describes a management procedure for quick hand-over phases in which ATM support-links are established and modified in real time. Based on this procedure, a mobile already linked to an initial station is taken over by a second station it has just reached. At that moment, the new station commands the ATM access network to establish the necessary connection(s) so that the mobile can, both transmit its user traffic to the other parity and, on the other hand, receive the incoming traffic from that same party. All processing required for this operation is done by the network's peripheral concentrators connected to the first and second stations.

This eliminates the risk of saturation of the hand-over phase processing units and ensures the capacity to manage a very large number of mobiles. Another advantage stems from the fact that virtual circuit switching in ATM executes low-level operations whose processing speeds-ensure extremely fast connections.

The procedure described in French Patent 2,714,559 can, however, show some limitations in certain situations of call traffic overload at one concentrator and/or in cases of extreme variations in radio propagation conditions. Network reaction time may then prove too long for the expected performance and, quality.

SUMMARY OF INVENTION

The purpose of this invention is to solve this problem and to offer a mobile unit access network of a type comprising multiple radio stations linked, by connectors to a distribution network, with each radio station covering a radio cell within which it can communicate with a mobile unit and each concentrator designed to ensure the virtual connection of at least one station with said distribution network.

For a call from a mobile, an essential feature of this invention provides for the establishment of virtual connections from the network to the stations covering a macrocell consisting of a pre-determined group of radio cells which cover the area in which said mobile is or is likely to move.

This feature makes it possible to anticipate the movements of a mobile due to the fact that the virtual connections required for a call are already established when the mobile comes under a new station, called the change-over station. So, as it moves, the mobile receives its user information without delay.

Consistent with another feature of this invention, each station within the network has an associated, predetermined macrocell as the station becomes the core station of this macrocell, and when a mobile unit leaves the coverage of one station—the fading station—and enters the coverage of another—the change-over station—it is designed to establish the virtual connections to the stations covering the macrocell associated with the change-over station and to release the virtual connections belonging to the stations in the macrocell associated with the previous station but not belonging to the macrocell associated with the change-over station.

Thus, a macrocell shifts simultaneously with the mobile.

Appropriately, the release of the virtual connections to the stations in the macrocell associated with the previous station but not belonging to the macrocell associated with the change-over station is delayed by a preset change-over time.

When radio cells covered respectively by stations within said network are spread over a dense geographic area, each macrocell is appropriately covered by a group consisting of the core station of said macrocell and of the stations adjoining to the core station or directly contiguous to the core station. This configuration of each macrocell is designed to accommodate, for example, dense geographic areas such as cities, etc.

When radio cells covered respectively by stations within said network are spread over a linear geographic area, which is, for example, the case with radio cells covering a road or highway, each macrocell is covered by a linear group consisting of the core station of the macrocell and of the stations adjoining to the core station. For example, each macrocell is covered by a group of three adjoining, aligned stations and said core station is the central station. Coverage may also be achieved by a group of two adjoining stations, with said core station being the station located behind the mobile in question, relative to its direction of movement.

Consistent with another feature of the invention, its network includes a table in which are described and recorded the characteristics of each macrocell of said network, inter alia the core station of said macrocell and the adjoining stations forming the macrocell.

Consistent with another feature of the invention, the network includes at least one processor which, upon receiving a request from a mobile just entering the coverage of a new station, called a change-over station, transmits to the appropriate concentrator(s) a message to create and release the virtual connections required for the creation and fading of the concerned macrocells. Such a request includes, inter alia, the identifiers of the virtual channels and paths assigned to the call in question, as well as an image of the previous macrocell.

According to a first process embodiment of the invention, the network includes a processor which is centralized. The request is then transmitted to the concentrator to which the change-over station is linked through a channel permanently established and identified, at the level of said change-over station, by a unique pair of identifiers of virtual paths and channels, the request being transmitted from the concentrator to said central processor over a channel identified both by a virtual channel identifier reflecting the address of said concentrator within the network and by a virtual channel identifier reflecting the address of said station in the concentrator.

According to a first process variant of this embodiment, the message to create and release the virtual connections required for the creation and fading of the concerned macrocells, transmitted by the central processor, is broadcast to all the concentrators in the network, which perform the screening.

According to a second process variant of this embodiment, the message to create and release the virtual connections required for the creation and fading of the concerned macrocells is transmitted point-to-point by said central processor to the concerned concentrator(s).

According to a second process embodiment of the invention, the network includes multiple processors intended, for example in, the concentrators, to create and release the virtual connections required for the creation and fading of the concerned macrocells. The processors may be shared.

According to a first process variant of this embodiment, the network is designed so that the message to create and release the virtual connections required for the creation and fading of the concerned macrocells, from a processor to the concerned concentrator(s), is transmitted over a permanent broadcast channel.

According to a second process variant of this embodiment, the network is designed so that the message to create and release the virtual connections required for the creation and fading of the concerned macrocells, from the processor of each concentrator to another concentrator, is transmitted over a virtual path permanently established between said two concentrators.

According to a third process derivative, it is designed so that the message to create and release the virtual connections required for the creation and fading of the concerned macrocells, from the processor of each concentrator to another concentrator, is transmitted over a virtual path permanently established between all concentrators. The virtual path is, appropriately, a virtual ring in which said message travels from one concentrator to another.

According to another process variant of this embodiment, the message is transmitted as many times as there are concentrators concerned by the creation and fading of the macrocells, each concentrator considering the message only if it must perform a virtual connection marking operation for the creation of the new macrocell or the fading of the previous macrocell.

BRIEF DESCRIPTION OF DRAWINGS

The features of the invention mentioned above, as well as others, will appear more clearly upon reading the following description of an application example. Reference will also be made to the Figures, in which.

DETAILED DESCRIPTION OF THE INVENTION

Figure 1:
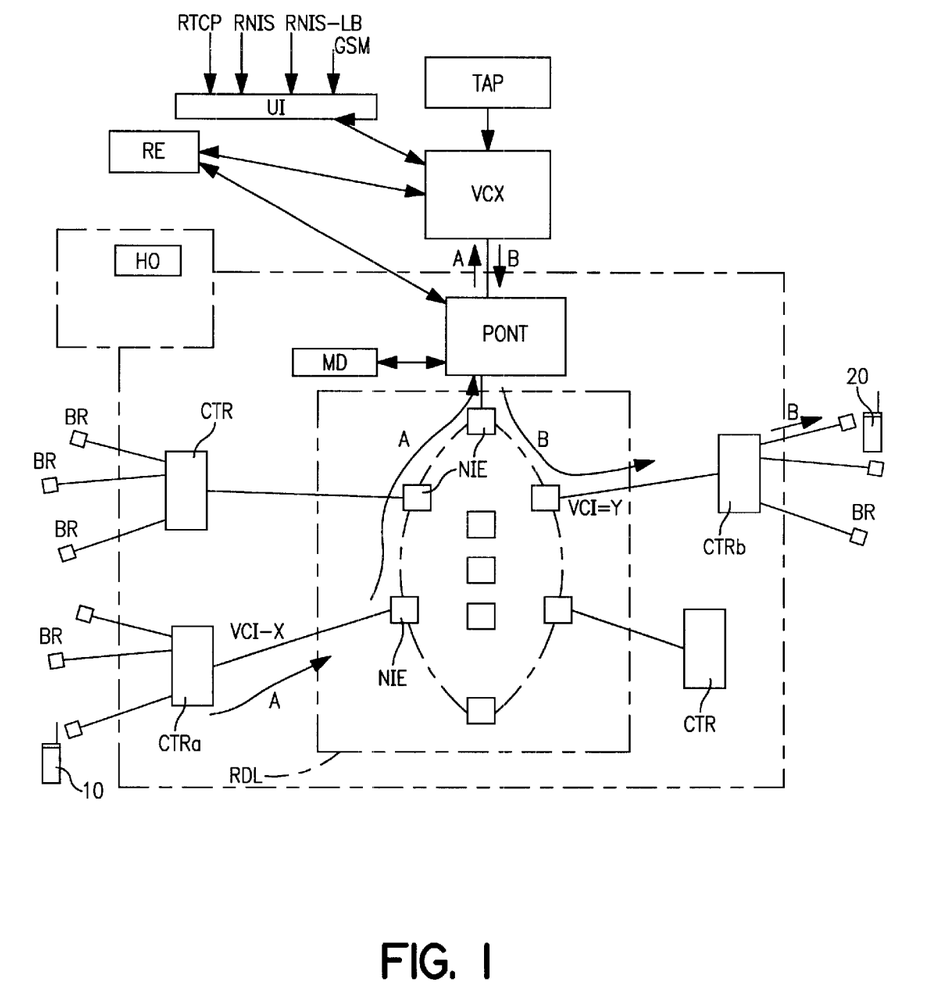
FIG. 1 is a block diagram of a mobile unit local access network according to this invention.

The mobile unit local access network MLAN represented in FIG. 1 consists of a set of concentrators CTR respectively connected (upstream) to insertion/extraction nodes NIE in an internal distribution network RDL and to which are connected multiple radio stations BR.

The MLAN network also includes a switching device PONT which is linked, on the one hand, with an insertion/extraction node NIE of network RDL and, on the other hand, with servers and switch VCX. Switching device PONT is meant to provide the interface between, on the one hand, switch VCX and/or the servers and, on the other hand, distribution network RDL. The switching device PONT consists, for example, of a virtual circuit mixer VF.

Switch VCX is linked, through interworking unit IU, with external networks of types VSRR as at RTCP; ISDN, B-ISDN as at RNIS-LB or GSMS as at GSM, or directly with other external networks EN of type MLAN mobile unit access networks identical to that of this invention. It provides, on the user level, the switching of virtual channels VC to ensure the establishment of, on the one hand, the local connections between two mobiles linked to the same access network MLAN and, on the other hand, the outgoing connections between a mobile in the MLAN network and a user in an external network EN or in another network accessible through interworking unit IU.

In FIG. 1, arrows A and B outline the concept of connection between two mobiles 10 and 20 linked to the same MLAN network, which of course is not necessarily always the case. The rising part of the connection is marked by arrow A and is identified by a virtual channel identifier VCI equal to, for example, X, while the virtual channel identifier VCI identifying the falling part of the connection, marked by arrow B, is equal to Y. Switch VCX translates the channel identifiers VCI for the call.

The connection between the two mobiles 10 and 20 is established initially in switch VOX and, in network RLD, it can evolve according to the movements of the mobiles.

Virtual channel identifiers VCI are handled globally, since translation of these identifiers VCI is effected only in the switch VCX. Consequently, all current calls carry different virtual channel identifiers VCI.

All calls are two-way. Considering the rising part A of this call, it is then constituted by a rising connection and a falling connection. These connections are identified by the same identifier VCI number whose value is, in this example, equal to X. However, as mentioned above, the values X and Y taken by the virtual channel identifiers VCI are different at both ends of the same call, whether it is local or outgoing.

The values X and Y of the identifiers VCI are assigned by a local- and outgoing-call processing server TAP during the connection establishment phase.

The MLAN network contains also a group of servers directly interconnected with the switching unit PONT and accessible, through distribution network RDL and switch VCX by permanent ATM links of the virtual circuit path VF.

These servers include a macro-diversity operator MD, which is used during hand-over phases, and a hand-over server HO.

The MLAN network represented could include other servers which are not described here since they are not directly linked to this invention.

Each concentrator CTR performs, in the rising direction (mobiles to network), the concentration of the flows coming from radio stations BR to which it is connected and, in the falling direction, it effects the demultiplexing of the flows coming from the network RDL and bound for stations BR to which it is connected. It also switches every virtual connection towards one station BR or the other based on VCI field analysis of the ATM cell headings circulating within the MLAN network.

Figures 2A, 2B:
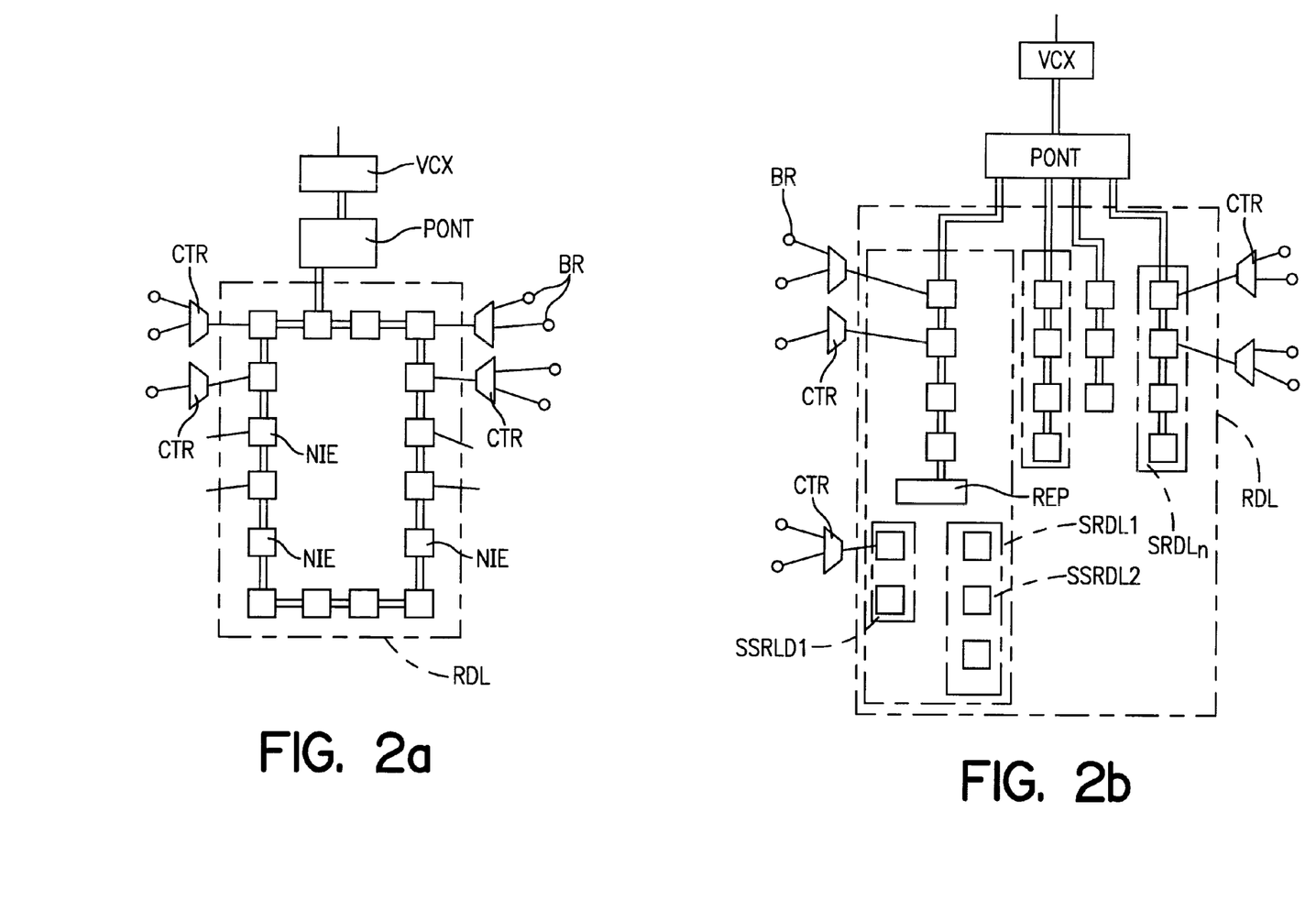
FIG. 2 is a block diagram showing the architecture of a distribution network in an access network consistent with this invention.

FIGS. 2a and 2b show two different topologies of a distribution network RDL. These network topologies are known, respectively, as double-ring counter-rotation looped network and double-bus segment network. These basic networks are developed around one basic entity which is an insertion/extraction node NIE arranged according to various topologies, to which a concentrator CTR is connected.

It is noteworthy that these basic networks can be combined and assembled in various ways so as to build, as required, any type of distribution network architecture, which enhances their implementation flexibility.

In the topology in FIG. 2a, only one insertion/extraction node NIE is connected to the switching unit PONT.

In FIG. 2b, the distribution network RDL is subdivided into subnetworks $SRDL_1$ and $SRDL_2$ respectively linked to the switching unit PONT. Each subnetwork SRDL consists of a segment of nodes NIE to which are connected respectively the Concentrators CTR. Certain subnetworks (in this case SRDL) can also be subdivided into sub-subnetworks $SSIDN_j$ whose heads are linked to a repeater REP at the tail end of a segment.

Figure 3:
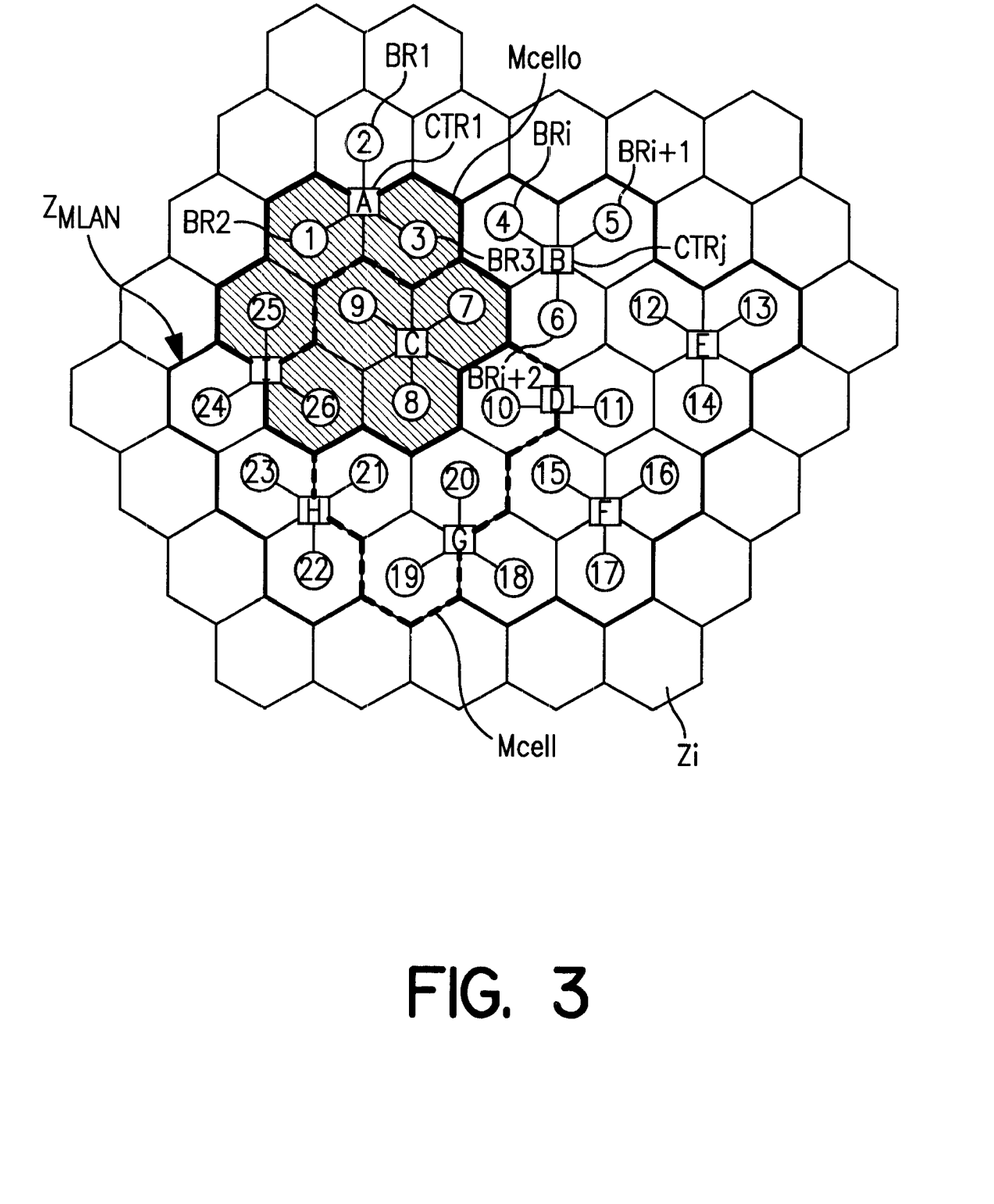
FIG. 3 is a diagram showing an access network in which two macrocells are defined according to this invention.

FIG. 3 shows, as an example, area $Z_{MLAN}$ covered by the set of 26 stations BR of a MLAN network. In this figure, hexagons represent the geographic areas $Z_1$ (still called radio cells in the technical field) respectively covered by the corresponding radio stations RS, themselves linked to concentrators $CTR_1$ (where I=1 to n, n being the number of radio stations—in this case, twenty-six—of the MLAN network and where j=1 to m, m being the number of concentrators—in this case, nine in network MLAN). It is noteworthy that, with the exception of concentrator D to which only stations 10 and 11 are linked, three stations are linked to the other concentrators.

In the sense intended in this description, a macrocell is a group of geographic areas or radio cells $Z_1$ grouped together so as to form a single entity. FIG. 3 shows two macrcells. Mcell and $Mcell_0$ whose boundaries are respectively materialized by a heavy line and a heavy dotted line. The macrocell Mcell consists of nine cells covered by stations 7, 8, 9, 26, 10, 19, 20 and 21. As for macrocell $Mcell_0$, it consists of the seven radio cells covered by stations 1, 3, 7, 8, 9, 25 and 26.

Consistent with the invention, all information coming from the distribution network RDL and bound for a mobile under the coverage of a macrocell Mcell end up not only at station $RS_1$ to which is linked but also to all stations $BR_1$ covering the geographic area of this macrocell. Thus, when this mobile moves from one station $BR_1$ to another station $BR_1$ belonging also to the macrocell Mcell, the ground links are already established. There is therefore no risk of interruption of user traffic related to, as in the case of known access networks, the processing times of the procedures to modify the support links, which consist, in this case, of the establishment of a connection on the new station $BR_K$ and the termination of the connection to the previous station RSj.

On the level of the distribution network RDL, a macrocell Mcell is defined by the establishment of a broadcast tree from the point of access materialized by the switching unit PONT to the ends, which are radio stations $BR_1$ covering said macrocell Mcell. One or more broadcast trees are therefore built in an access network MLAN.

For the definition of the macrocells, all the radio cells covered by a given local MLAN network are divided into zones containing several radio cells. An access network MLAN can therefore represent only one or several fixed macrocells. The choice of the number of macrocells supported by a network depends on its size in terms of number of radio stations BR and/or the density of traffic anticipated.

It is noteworthy that only when the, mobile moves from one fixed macrocell Mcell to its neighbour is it necessary to redefine the, macrocell by defining the new and redefined support links, i.e. those related to the new and redefined macrocell, and to eliminate the previous links, i.e. those related the previous macrocell. In this case in particular, the quality of a call can therefore be affected during the transition between two fixed macrocells.

According to a process embodiment the invention, a macrocell consisting of several radio cells is created constantly around a mobile during a call. This way, a macrocell follows this mobile constantly. Each modification to the mobile's link from one station, called fading station, to a new station, called change-over station, results in the creation of a new macrocell around the change-over station by marking towards additional stations and the fading of the previous macrocell by the release of more stations. However, the new station belongs to both the previous and the new macrocells, so that there is no call interruption during this modification. The advantage stemming from this method is the possibility to delay the creation and fading processing of the concerned macrocells without affecting the call on the mobile.

It is noteworthy that in the remainder of this description, the term "creation of macrocell" applies not only to the creation of the initial macrocell, i.e. the macrocell formed during the call initiating procedure, but also to the creation of the other, subsequent macrocells following the movement of the mobile. The fading of a macrocell is the operation which consists of the release of the stations covering said macrocell. The operations consisting in the creation and fading of macrocells are performed by marking and fading ATM connections in the concentrators to which the concerned stations are connected.

In a figurative way, we will call "shift of a macrocell" the process which leads, when leaving a macrocell called fading, to the fading of the previous macrocell and to the, creation of a new macrocell.

As we will see afterwards, the process concerning the shift of a macrocell consists in establishing the virtual connections of the stations which cover the new macrocell and did not already cover the previous macrocell, and to release the virtual, connections of the stations which covered the previous macrocell and do not cover the new station.

The station around which a macrocell is created is called hereinafter the core station.

Figure 4A:
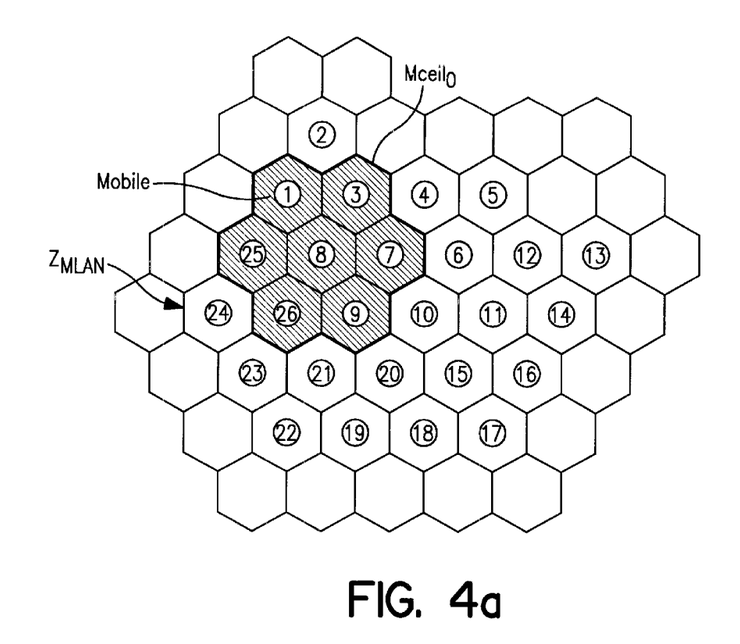
FIGS. 4a to 4c are views illustrating the shift of macrocells following the movement of a mobile.

FIG. 4a represents, in the same area $Z_{MLAN}$ as in FIG. 3, a regular macrocell $Mcell_0$ consisting of seven radio cells formed by the stations BR bearing respectively numbers 1, 3, 7, 8, 9, 25 and 26. Station 9 is the core station. The mobile Mobile is initially linked to station number 9. It is during the call initiating phase that the RDL network creates the virtual connections necessary for the positioning of the macrocell $Mcell_0$ towards the group of stations BR whose radio cells are adjacent to those where the mobile is located at the time. During the call and as long as the mobile Mobile is linked to the station 9, the traffic bound for the mobile Mobile is switched within the network RDL to all seven stations forming the macrocell $Mcell_0$. The traffic transmitted by the mobile is itself routed through the network RDL, no matter which station BR in the macrocell it was transmitted from.

Figure 4B:
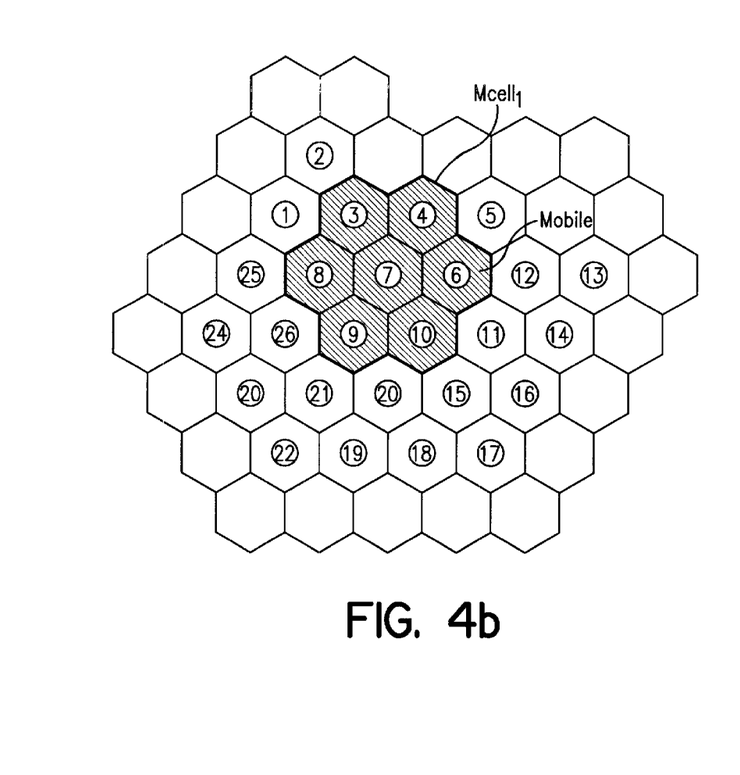

In FIG. 4b, the mobile Mobile has moved towards station 7 and the macrocell $Mcell_0$ has shifted to the right to become the macrocell $Mcell_1$, also consisting of seven radio cells formed by the stations BR bearing respectively numbers 3, 4, 6, 7, 8, 9 and 10. Station 7 is the new core station. The mobile's transfer from station 9 to station 7 defines a phase of the hand-over during which a dialogue is initiated between the mobile, the stations and the distribution network RDL. The purpose of this exchange is to order the RDL network to mark the new macrocell $Mcell_1$ based on information which the mobile can be required to retrieve from station 9 which it has just left. This marking of the macrocell $Mcell_1$ consists in marking the concerned concentrators in order to release stations 1, 25 and 26 and to establish links to stations 4, 6 and 10. The information required for this marking is, namely, the identity of the connection, i.e. the identifiers of its virtual paths VPI and of its virtual channels VCI for signaling and user traffic, and the specific parameters of the call, such as the rate required for the call, the quality of service, etc.

It is noteworthy that, during the hand-over phases, at least the two stations (in this case, stations 7 and 9) capable of receiving the traffic signals transmitted by the mobile can transmit a user flow towards the network RDL which is relevant. A process, called macrodiversity, makes it possible to select the best flow of information between these flows. This macrodiversity process is not the object of this description.

Figure 4C:
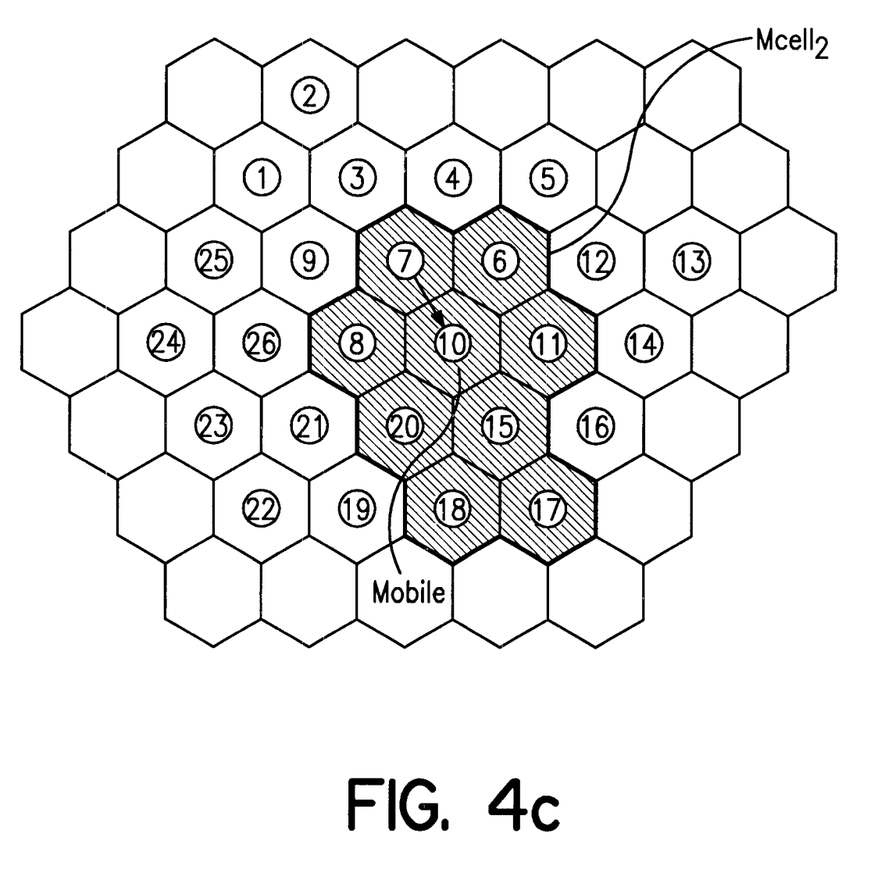

In FIG. 4c, the mobile has now moved towards station 10. The macrocell $Mcell_1$ follows this movement and has become macrocell $Mcell_2$, consisting this time of nine radio cells formed by the stations BR bearing respectively numbers 6, 7, 8, 9, 10, 11, 15, 17, 18 and 20. The virtual connections of stations 3, 4 and 9 have been released while those of stations 11, 15, 17, 18 and 20 have been established.

Figure 5A:
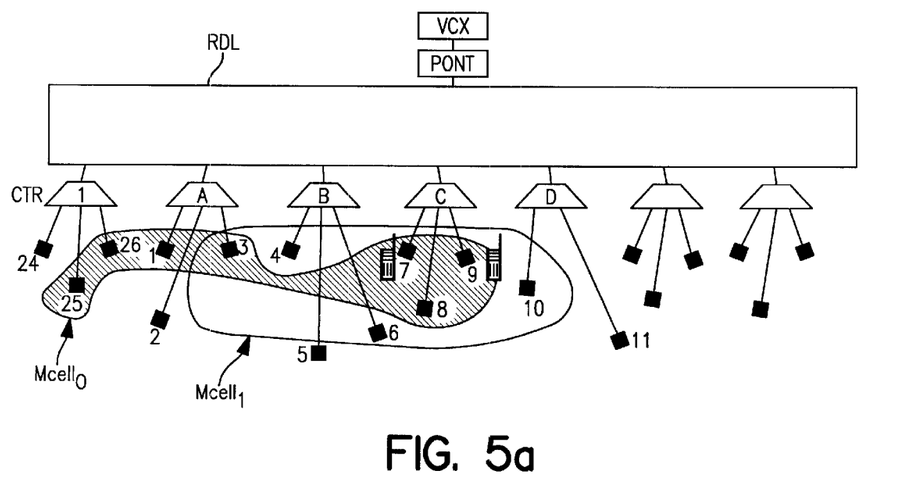
FIGS. 5a and 5b show an access network consistent with this invention during a macrocell shift.
Figure 5B:
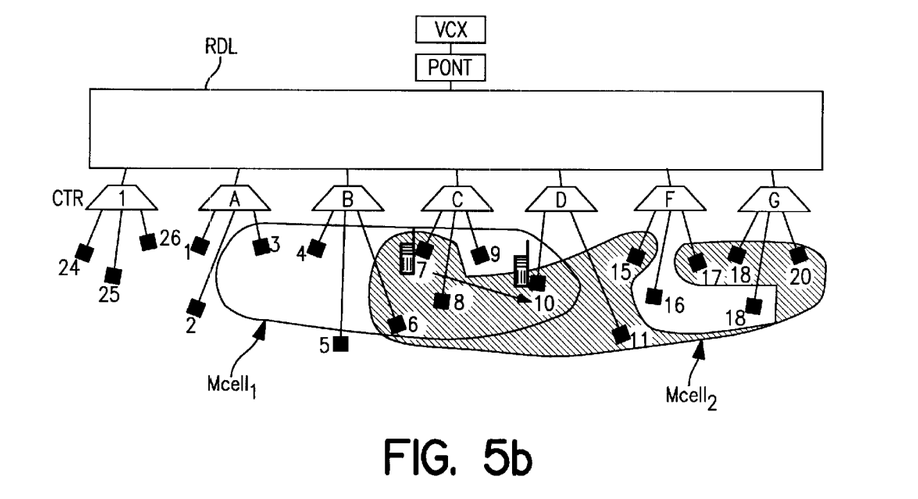

FIGS. 5a and 5b show a diagram of the network MLAN with the switching unit PONT, the switch VCX, the distribution network RDL, the concentrators CTR and several stations BR. Highlighted in FIG. 5a are macrocells $Mcell_0$ and $Mcell_1$ and, in FIG. 5b, macrocells $Mcell_1$ and $Mcell_2$, in order to view the stations concerned by the macrocell shifts, as ell as the releases and markings performed during these shifts.

It is noteworthy that, in the example mentioned above, the macrocells $Mcell_1$ and $Mcell_2$ have different profiles. So, consistent with a feature of the invention, a macrocell can change its shape while shifting. It can, for example, be regular and have a size of seven or nineteen radio cells in a dense geographic area, such as an urban area, and change to a size of three or even two radio cells "in line" when moving to a road access, if we consider that the whole geographic area belongs to the same MLAN.

Figure 6:
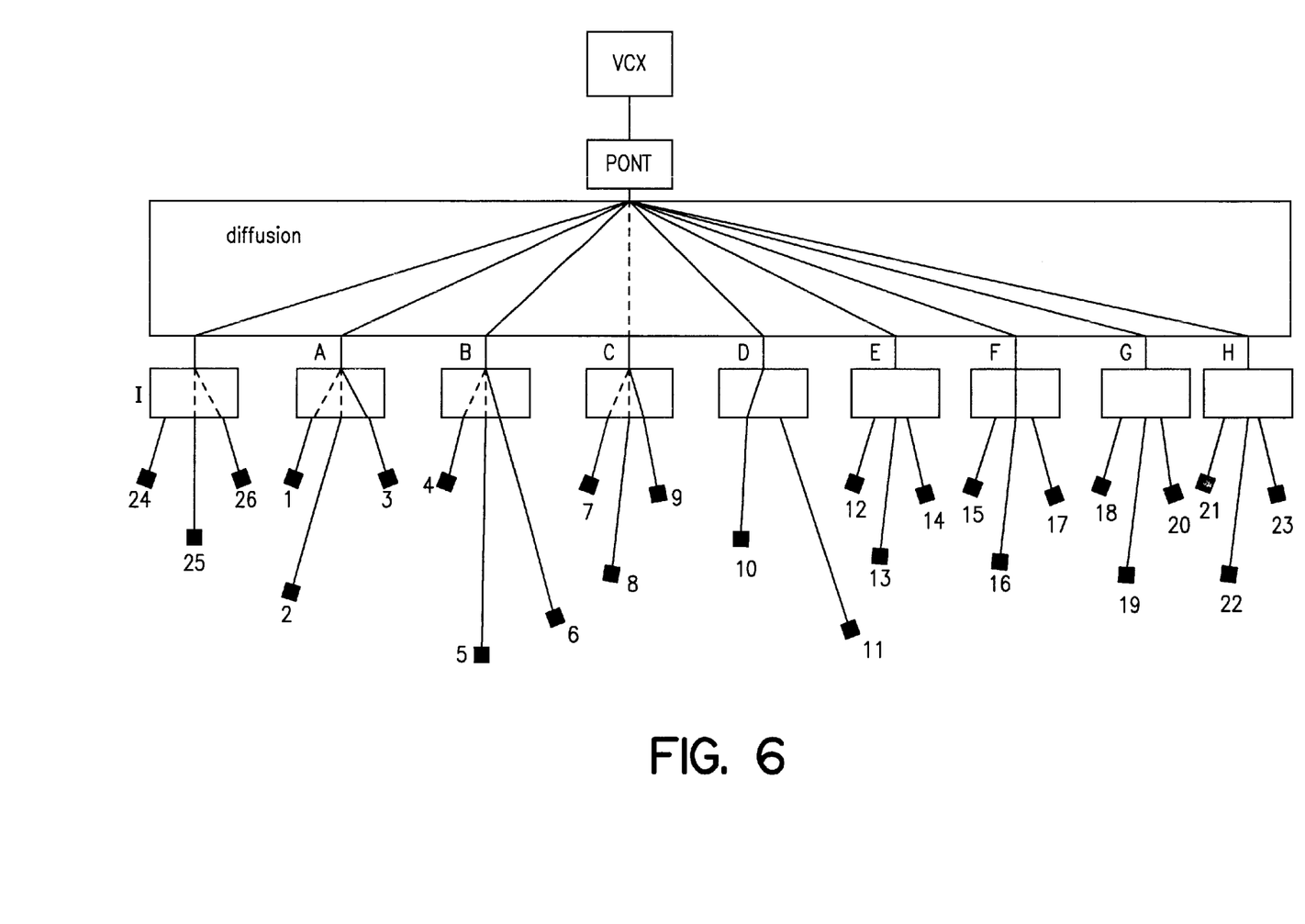
FIG. 6 is a view illustrating the release, the retention and the establishment of the virtual connections in the concerned concentrators in an access consistent with this invention.

FIG. 6 illustrates the release, the retention and the establishment of the connections necessary to the fading and creation of respectively of macrocells $Mcell_0$ and $Mcell_1$ in FIG. 4a and 4b. In the concerned concentrators, the connections to be released to the stations of the fading macrocell $Mcell_0$ are represented by dotted lines, the connections retained by double dashes, and the connections to be established to the stations of the change-over macrocell $Mcell_1$ by single, heavy dashes.

Figure 7A:
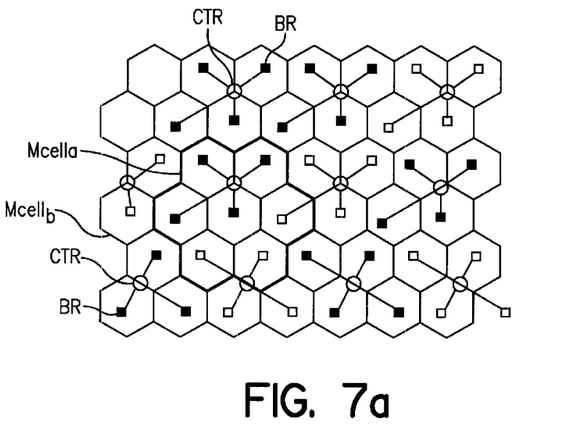
FIGS. 7a and 7b show macrocells respectively in the case of a dense geographic area and in the case of a linear geographic area.
Figure 7B:
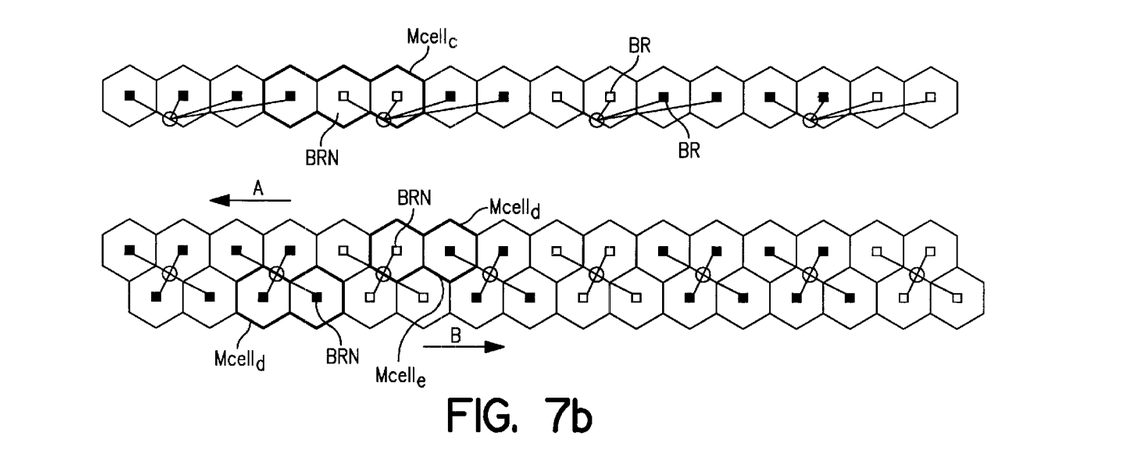

FIGS. 7a, 7b and 7c represent an area covered by stations BR linked, in fours, to concentrators CTR. In these Figs, the stations are represented by squares and the concentrators, by disks.

FIG. 7a shows two examples of regular macrocells: one is the macrocell $Mcell_a$, with a regular size of seven cells (boundaries in heavy lines), and the other is the macrocell $Mcell_b$, with nineteen cells (boundaries in dotted lines), in a large area. This macrocell is appropriate for dense geographic areas.

FIG. 7b outlines a macrocell $Mcell_c$ composed of three cells in a linear area. The station, called the core station $BR_a$, to which is normally connected the mobile, is in the center of the macrocell $Mcell_c$. In this configuration, the direction of the shifting is imposed by the radiobcells but not the direction of movement, as the mobile unit may be moved in one way or another.

FIG. 7c outlines a macrocell $Mcell_c$ composed of two cells in a linear area. The core station $BR_N$, to which is normally connected the mobile, is behind the macrocell $Mcell_d$ in relationship to the shifting sense of the mobile (see arrow A) that is imposed. There is also an outline of a macrocell $Mcell_e$ composed of two cells where the core station BR is also located behind the macrocell in relationship to the sense of shifting of the unit (see arrow B).

In order for the network RLAM to assure the creation and the fading of the macrocell, it is necessary that they be described and registered in a centralized table, for example at the level of the switching unit PONT of the network RLAM. Each macrocell is therein described in relation to its core station. Upon initializing the network, each concentrator CTR receives the description of the macrocells Mcell which concern the Stations BR that connects it.

The definition table of the macrocell make a census of, for each station of the network RLAM, the list of its neighbors of which the radio cells form between them a macrocell. This station is the core station of the macrocell.

The description of the macrocell may be modified by the operator administering the network in function of the evolution of the physical architecture of the network RLAM due, for example to an extension, modifications, etc., indeed in function of considerations linked to radio transmissions.

For example, the following chart groups together, for each of the three station 9, 7, 8, attached to the concentrator CTR marked C in FIG. 3, the list of the neighboring stations forming among them the macrocells $Mcell_0$, $Mcel_1$ and $Mcell_2$, the three stations 9,7 and 8 being the core stations of the macrocells $Mcell_0$, $Mcell_1$ and $Mcell_2$.

In order for the network RLAM to assure the creation and the fading of the macrocell, it is necessary that they be described and registered in a centralised table, for example at the level of the switching unit PONT of the network RLAM. Each macrocell is therein described in relation to its core station. Upon initializing the network; each concentrator CTR receives the description of the macrocells Mcell which concern the stations BR that connects it.

The definition table of the macrocell makes a census of, for each station of the network RLAM, the list of its neighbours of which the radio cells form between them a macrocel. This station is the core station of the macrocell.

The description of the macrocell may be modified by the operating administering the network in function of the evolution of the physical architecture of the network RLAM due, for example to an extension, modifications, etc., indeed in function of considerations linked to radio transmissions.

For example, the following chart groups together, for each of the three stations 9, 7, 8, attached to the concentrator CTR marked C in FIG. 3, the list of the neighbouring stations forming among them the macrocells $Mcell_0$, $Mcell_1$ and $Mcell_2$, the three stations 9, 7 and 8 being the core stations of the macrocells $Mcell_0$, $Mcell_1$ and $Mcell_2$.

| CORE STATION | CONCENTRATOR | | | | | | |
|---|---|---|---|---|---|---|---|
| 9 | 1  | 25 | 26 | 3  | 8 | 7 |    |
| 7 | 10 | 6  | 4  | 3  | 8 | 9 |    |
| 8 | 26 | 21 | 20 | 10 | 7 | 9 | 19 |

$Mcell_0$ (FIGS. 3 and 4a)
$Mcell_1$ (FIG. 4b)
$Mcell_2$ (FIG. 3)

In this table, the stations are identified by a number, but it is understood that they could be by the virtual identifiers (VPI and VCI in ATM) which make it possible to reach them.

It is also noteworthy that the number of adjacent stations is not necessarily the same for each core station. This illustrates the fact that the macrocells Mcell can be of different sizes.

It is noteworthy that FIG. 3 schematically represents a geographic area covered by a network containing nine concentrators CTR to which are linked twenty-six stations BR. For engineering purposes, the concentrators CTR link the nearest station BR. It is stressed, however, that the shifting macrocell technique described herein is separate from this condition. In other words, the notion of macrocells such as it is described herein depends neither on geographic proximity between stations BR, and their linking concentrator CTR, nor on the number of stations BR linked to one concentrator CTR. Indeed, a macrocell Mcell is defined by virtual links and not by physical links.

As one can see, the macrocells technique as outlined above makes it possible to anticipate the movements of a mobile by establishing beforehand the ATM connections to the stations whose areas of coverage are adjacent to that of the station to which it is connected. On the way in, all traffic bound for the mobile arrives at all the stations in its own geographic environment. The mobile, as it moves, therefore receives without delay its user information. On the way out, the information it transmits will also be transmitted to the network.

The operations consisting in the creation and the fading of macrocells are performed without the time constraints and can be delayed if, at the time they are ordered, the network resources required for their execution are unavailable. This delay in execution will nor result in disruptions in user traffic.

These operations of creation and fading of macrocells during the shift consist in releasing the connections to the stations of the previous macrocell which do not cover the new macrocell and to establish the connections to the stations which are present in the new macrocell. They may also consist in releasing the connections to the stations of the previous macrocell which do not cover the new macrocell and to establish the connections only to the stations which are present in the new macrocell but not in the previous macrocell.

It is noteworthy that the overlap between the new macrocell and the previous macrocell consists of a widely variable number of elementary radio cells, normally including that of the change-over station. This number depends as much on the direction of movement of the mobile as on the profiles of the macrocells, on the fact that the mobile is at the limit of the MLAN network, etc.

These operations of creation and fading of macrocells during a shift can be done in a centralized manner, i.e. from a central processor acting on behalf of the whole MLAN network, or in a distributed manner, i.e. from processors distributed across certain elements of the network, such as the concentrators.

These operations require the processor(s) which execute them to know various parameters, but also that channels capable of supporting the various signaling messages be established in the ATM network.

The necessary information is, aside from certain radio parameters not discussed in this description, the information related to the call in the RDL network. This means the channel and path identifiers VCI/VPI assigned to the concerned connection and the image of the previous macrocell.

It is noteworthy that the virtual channel identifier VCI will provide the identity of the connection to be created in the new macrocell. As for the image of the previous macrocell, it will allow the change-over station to know which stations are to be connected and which stations are to be faded.

Consistent with the centralized processing approach, the change-over station, to which the mobile has just connected following its movement away from the previous station, sends to a central processor, appropriately connected directly to the switching unit PONT, a request for the creation and the fading of macrocells in the form of a message containing, inter alia, all the virtual channel and path identifiers VCI/VPI which are related to the call in progress and are therefore associated to the channels supporting the user traffic but also to the channel supporting the signaling.

This message is first transmitted to the concentrator CTR to which the change-over station is linked point-to-point over a channel established permanently and identified, at the level of the station concerned, by a unique pair of virtual path and channel identifiers VPI/VCI (for example, equal to V/n). The processor in the PONT is then seen by all stations with this same pair of identifiers (VPI/VCI=V/n). The message is then transmitted to the switching unit PONT after being translated, at the level of the concentrator CTR to which the change-over station is linked, of the pair of identifiers VPI/VCI which becomes equal to Z/q, in which the virtual path identifier VPI=Z identifies the address, in the distribution network RDL of the concentrator CTR to which the change over station is linked and the virtual channel identifier VCI=q identifies the change over station. This way, the processor in the PONT can positively identify the station for which the request was initiated. The switching PONT unit answers the request thus received and processes it. To do so, it consults the table listing the stations associated to the macrocell whose core station is the change-over station initiating the request received and deduces from this the identities of the concentrators in which the virtual connections corresponding to the new macrocell must be created. Furthermore, using the identifiers VPI/VCI belonging to the call in progress, it can determine which stations are associated to the previous macrocell and deduce from this the identities of the concentrators in which the virtual connections must be released.

The switching unit PONT then transmits to the concentrators concerned a message listing the links they must create or release. This message can be broadcast to all the concentrators in the network and, in this case, it contains the identities of the targeted concentrators and the characteristics of the connection to be created. It can also be transmitted point-to-point to the concerned concentrator(s).

The main drawback of this centralized process for the creation and fading of macrocells is concentrating all the creation traffic towards only one processing unit, in this case the processor or in the switching PONT unit.

Consistent with the distributed processing approach, the processes of creation and fading of macrocells are preformed by processors distributed in the distribution network RDL, appropriately in each of the concentrators CTR in the RDL distribution network.

To allow the change-over station to gather the information necessary for their implementation, namely the information related to the call in progress and the image of the previous macrocell, a dialogue procedure is established directly between the concentrators to which the fading station and the change-over station are linked respectively.

The change-over station then sends to the concentrator to which it is linked a message requesting the creation of the macrocell of which it is the core station and the fading of the previous macrocell. This message contains, inter alia, the table listing the stations belonging to the new macrocell and the one listing the stations in the previous macrocell. Once this message is received, the concentrator can deduce from it the identities of the concentrators concerned by the creation of the new macrocell and those concerned by the fading of the previous macrocell.

The concentrator then sends to the concentrators a request for either the creation of the new macrocell, or the fading of the previous macrocell. For the transmission of this request to the concerned concentrators, various solutions can be considered.

According to a first solution, a permanent broadcast channel is established from the switching unit PONT. The request coming from the concentrator to which the change-over station is linked is broadcast over the entire network through a dedicated virtual path, while the PONT provides only the switching of the virtual paths. All the processors in the network's concentrators therefore receive the request, but only those recognizing themselves as recipients perform the marking requested for the establishment or the release of the virtual connections involved in the creation of the new macrocell or the fading of the previous macrocell. It is specified that the message transmitted by the concentrator to which the change-over station is linked contains all the characteristics of the connections involved in the macrocell. Based on this request, the concerned concentrators perform the requested connections or releases.

According to a process derivative, a meshing, of permanent virtual paths is established between all the possible pairs of concentrators. The concentrator to which the change-over station is linked addresses, point-to-point and using the corresponding virtual path, each of the concentrators targeted by the creation or fading of the macrocells. This way, only the concerned concentrators are solicited.

This solution offers the advantage of soliciting only the concerned concentrators, unlike the previous solution where all the concentrators in the network are activated for all macrocells to be created or faded.

This second solution, however, has the disadvantage of generating a relatively large flow of messages. Indeed, six messages are required, for example, for the creation of a regular macrocell of size seven in which each station is dependent upon a different concentrator.

Another process derivative consists in providing for the transmission, by the concentrator to which the change-over station is linked, of only one message using a common dedicated virtual channel established permanently between all the concentrators. This virtual channel is, for example, a virtual loop circulating from one concentrator to another, as in the first process, all the concentrators in the network receive the request, but only those recognizing themselves as recipients perform the marking.

A last solution, similar to the previous one, consists in providing a common dedicated channel in a virtual loop and to transmit over this channel as many messages as there are concentrators concerned by the creation of the new macrocell or the fading of the previous macrocell. In this case, the screening of the message is performed at the ATM level, with the concentrators letting the request pass through to their processor only if a virtual connection marking operation is necessary for the establishment of the new macrocell or the fading of the previous macrocell.

The creation of macrocells such as it has been described is based on assumptions of geographic coverage of the stations and of geographic proximity of the stations. However, it is possible that a mobile suddenly hangs on to a radio station which is not located in the area covered by the macrocell in which it has evolved so far. This situation occurs, for example, when there is a surge of a radio station in the middle of a radio station not adjacent to it.

Figure 8:
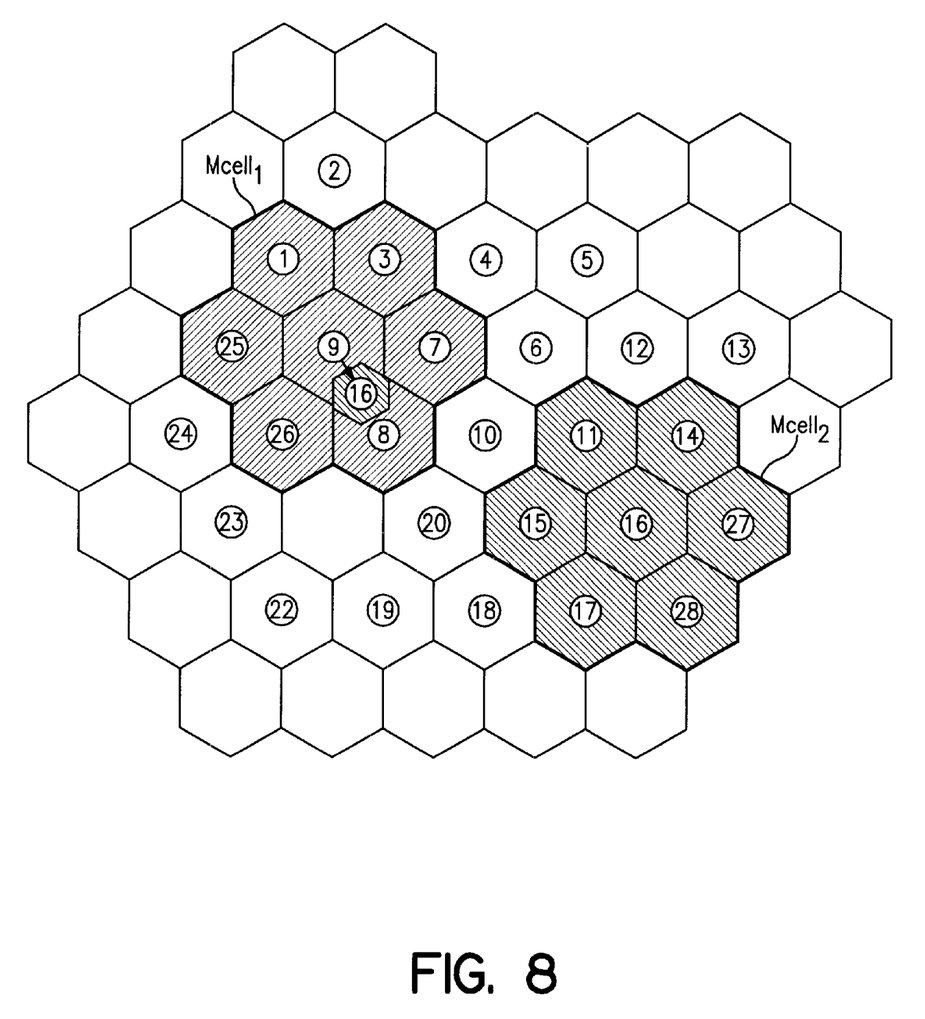
FIG. 8 illustrates the shift of a macrocell in a surge condition.

This phenomenon is illustrated in FIG. 8. The mobile located in macrocell $Mcell_1$ linked to the station covering radio cell 9 is suddenly radio-linked with surge 16' of cell 16, which does not belong to the area covered by the macrocell $Mcell_1$ (radio cells 1, 3, 25, 7, 26, 9 and 8. The mobile is therefore no longer connected by the network, for either transmission or reception.

Although normally marking the change-over station is pointless, since of course the change-over station covers an area belonging to the initial macrocell, this surge phenomenon brings about a routine marking new change-over station in addition to the markings normally performed for the creation of the new macrocell.

Consequently, in our example, the mobile commands the station coveing cell 16 to create a macrocell $Mcell_2$ whose core cell is cell 16 and whose radio cells, in the example represented, bear numbers 16, 11 4, 15, 17, 27 and 28. The purpose of the creation of the macrocell $Mcell_2$ is to mark the connection on station 16, which then allows the mobile to resume calls.

Normally, the procedure to be executed consists in marking seven new connections respectively to stations 16, 11, 14, 15, 17, 27 and 28, and to release seven other connections to stations 9, 1, 3, 25, 7, 26 and 28.

It is noteworthy that the time required for the creation of the macrocell $Mcell_1$ and the fading of macrocell $Mcell_1$ may have been relatively long, which could result in a long outage time for the call.

However, the surge phenomenon can be reduced to a transient phenomenon which, preferably, could be absorbed. To solve this problem, it is suggested to retain, for a preset period of time, the markings on the cells of the previous macrocell $Mcell_1$.

To understand the implementation of this characteristic, one should refer to FIGS. 4a and 4b. One can see that the comparison between the macrocell $Mcell_0$ and the macrocell $Mcell_1$ indicates the address of the three cells to be created, in this case cells 10, 6 and 4, and of the three cells to be faded, in this case cells 9, 3 and 8. It is suggested to perform the fading of previous cells 9, 3 and 8 only a certain time after creating the markings on cells 10, 6 and 4. This way, during this period, the active macrocell will in reality consist of all the cells forming the previous and the new macrocells $Mcell_0$ and $Mcell_1$, i.e. cells 1, 3, 4, 6, 7, 8, 9, 10, 25 and 26. It is understood that this technique results in a shift which is no longer a simple slip as is the case when the creation of the new macrocell and the fading of the previous macrocell are simultaneous.

Figure 9A:
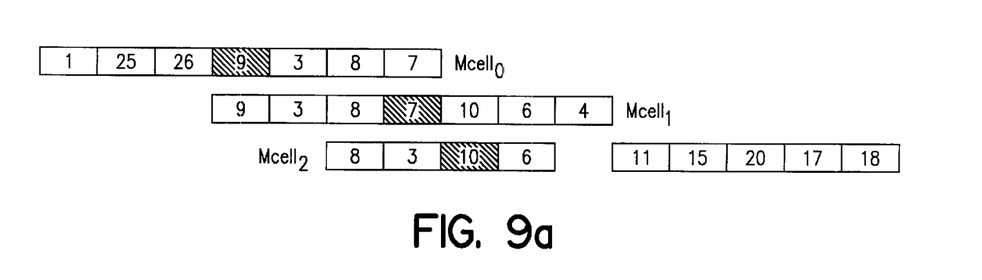
FIGS. 9a to 9c are views illustrating the shifts of three macrocells in a surge condition.
Figure 9B:
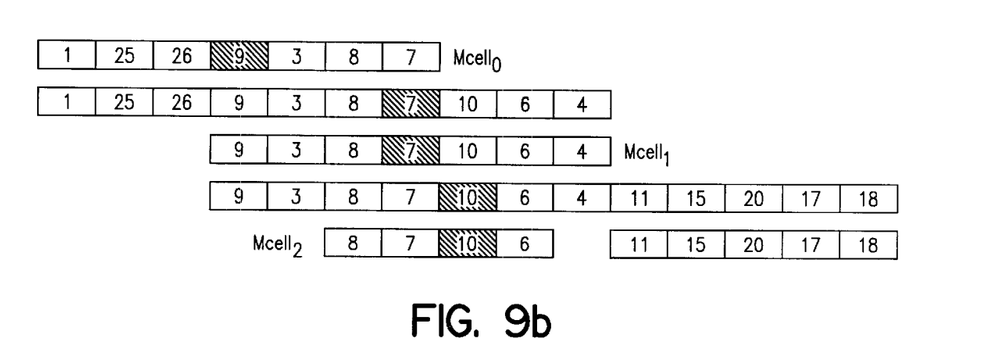

FIG. 9a illustrates the case of a shift by simple slip on the three macrocells $Mcell_0$, $Mcell_1$ and $Mcell_2$ previously described in relation with FIGS. 4a to 4c and, in FIG. 9b, the case of a shift with retention of the same three cells.

Figure 9C:
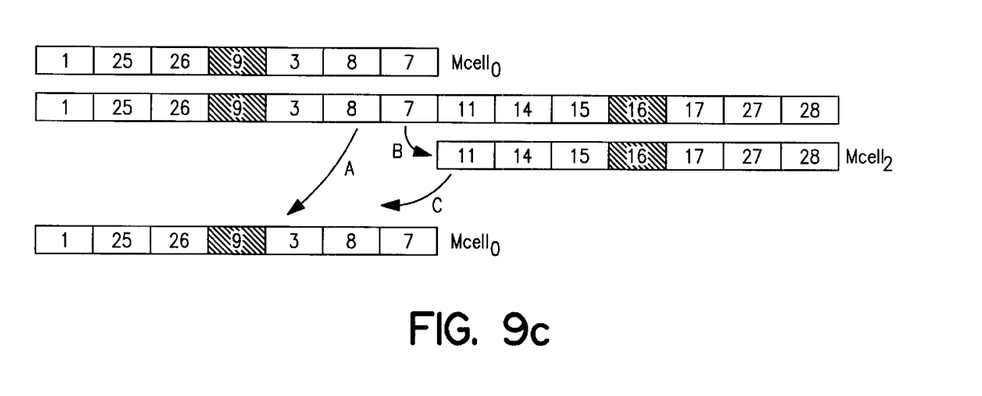

Considering the case of the surge illustrated in FIG. 8, the process illustrated in FIG. 9c is as follows. The mobile moving into surge 16' of station 16 causes the creation of macrocell $Mcell_1$. For a preset period of time, both macrocells $Mcell_0$ and $Mcell_1$ are simultaneously marked.

If the mobile returns before the expiration of this period under the coverage of the initial macrocell $Mcell_0$ (arrow A), this macrocell has not been faded and the transfer to the coverage of stations 1, 25, 26, 9, 3, 8 and 7 will occur without any degradation of the call.

However, if it does not return quickly under the coverage of the initial macrocell $Mcell_0$ (arrow B), this macrocell is faded, because it is considered that the mobile will not return under this macrocell. If this was the case anyway (arrow C), a normal surge situation would occur, with the resulting negative effects.

What is claimed is:

1. A mobile telephone local access network of the type including a plurality of radio stations connected through concentrators to a distribution network, each radio station serving an area covering a radio cell inside which a mobile unit can be in communication, said radio stations and concentrators being grouped into macrocells in concerned associations, each concentrator providing a virtual connection to at least one radio station with one node of said network, said distribution network comprising means for establishing the virtual connection to the radio station in the area of macrocell coverage in which a mobile unit is located and also to neighboring radio stations, wherein said network comprise:

table means identifying each radio station of said access network which is associated with at least another radio station so as to jointly cover a macrocell area;

at least one processor means for transmitting a request to at least one processor identifying a new station and said communication when a mobile unit in communication enters into the coverage area of said new station;

determining the stations that are associated with said new station responsive to an identification of said new station, and of an identification of said communication, the stations that were associated with the station serving an area of macrocell in which the mobile unit was located before entering into the area covered by said new station;

deducing from the determination of which stations should receive the virtual connections and which of said virtual connections should be released in order to redefine the macrocell; and transmitting a message to the concerned concentrators identified by said deduction for establishing connections within the redefined macrocell and for releasing said virtual connections in a previous macrocell.

2. The mobile local access network according to claim 1, further comprising a unique centralized processor, means for transmitting a request to said centralized processor, said distribution, network, permanently establishing a channel between each station and each concentrator, said channel being identified by a unique pair of identifiers of virtual paths and channels and between said concentrator and said processor, a channel being identified by an identifier of a virtual path reflecting the address of said concentrator within said network and an identifier of a virtual channel reflecting the address of said new station.

3. The mobile local access network according to claim 2, further comprising means for broadcasting said message towards all the concentrators in said network.

4. The mobile local access network according to claim 2, further comprising means for transmitting said message point-to-point toward each concentrator in said network.

5. The mobile local access network according to claim 1 in said network, further comprising one processor per concentrator, and means for transmitting a message from a processor toward the concerned concentrators via a permanent broadcast channel.

6. The mobile local access network according to claim 1, further comprising one processor per concentrator, and means for transmitting from a processor in one of said concentrators, toward the concerned concentrators via a virtual path permanently established between said one and other concentrators.

7. The mobile local access network according to claim 1, further comprising one processor per concentrator, and means for transmitting a message from a processor in one of said concentrators toward the concerned concentrators via a permanently established virtual channel arranged ring a virtual ring forming a macrocell in which said message can travel from said one concentrator to said other concentrator while said mobile moves within said macrocell area.

8. A method of establishing virtual connections in a distribution network of a local mobile access network of a type including a plurality of radio stations connected, through concentrators, to said distribution network; a plurality of data processors; each radio station forming a cell covering an area inside which a mobile unit can be in communication; said distribution network including means for associating a predetermined number of radio stations and concentrators in a single entity so as to form a macrocell having a shape defining a macrocell coverage area which surrounds a position where said mobile unit is then located, each concentrator providing a virtual connection for connecting each associated radio station of said macrocell with one node of said network, wherein said method includes the following steps:

transmitting a message to at least one of said data processors identifying a new radio station when a mobile unit already in communication enters an area covered by said new radio station;

determining which radio stations surround said new radio station, and which radio stations were previously associated with the radio stations covering the area in which the mobile unit was located before entering the area covered by said new radio station;

identifying radio stations which should receive new virtual connections and radio stations which should be released from previous virtual connections in order to reshape the macrocell so as to provide it with a new macrocell coverage area which surrounds a new position of the mobile unit resulting from movement from said unit: and transmitting a message to the concentrators associated with the radio stations thus identified with said new virtual connections instructing said concentrators to establish or release said new or existing virtual connections, respectively, in order to form the reshaped macrocell.

9. A method of establishing virtual connections in a distribution network of a local mobile access network of a type including a plurality of radio stations connected, through concentrators, to said distribution network; a plurality of data processors; each radio station forming a cell covering an area inside which a mobile unit can be in communication; said distribution network including means for associating a predetermined number of radio stations and concentrators in a single entity so as to form a macrocell having a shape defining a macrocell coverage area which surrounds a position where said mobile unit is located, each concentrator providing a virtual connection for connection each associated radio station of said macrocell with one node of said network, wherein said method includes the following steps:

transmitting a message to at least one of said data processors identifying a new radio station when a mobile unit already in communication enters an area covered by said new radio station;

determining which radio stations surround said new radio station, and which radio stations were previously associated with the radio station covering the area in which the mobile unit was located before entering the area covered by said new radio station;

identifying radio stations which should receive new virtual connections and radio stations which should be released from previous virtual connections in order to reshape the macrocell so as to provide a new macrocell coverage area which surrounds a new position of the mobile unit resulting from movement of said unit;

transmitting a message to the concentrators associated with the radio stations thus identified instructing said concentrators to establish or release said new or existing virtual connections, respectively, in order to form the reshaped macrocell; and a further step wherein releasing the previous virtual connections or radio stations which are not associated with said reshaped macrocell is delayed for a present period of time after establishing said new virtual connections.

10. The method according to claim 9, wherein said transmitted request includes identifiers of the virtual path and virtual channels assigned to the communication.

11. The method according to claim 10 and the further step of providing one processor per concentrator, said message from a processor being transmitted to each concerned concentrator for establishing and releasing the connections through virtual channels permanently established between each pair of concentrators.

12. The method according to claim 11 wherein each of said macrocells is a virtual ring in which a message can travel from one concentrator to another concentrator.

13. The method according to claim 10 and the further step of providing one processor per concentrator, said message from a processor being transmitted to concerned concentrators for establishing and releasing the connections through virtual channels permanently established between all of the concentrators.

14. The method according to claim 13 wherein said message is retransmitted within said macrocell as many times as there are concerned concentrators for establishing and releasing said connections, each of said concentrators responding to said message only if it must perform a virtual connection marking operation.

15. The method according to claim 9, wherein said request is transmitted to a concentrator to which said new radio station is linked via a channel permanently established and identified by a unique pair of identifiers of virtual paths and channels and from said concentrator to at least each processor via another channel identified by an identifier of a virtual path having an address of said new radio station.

16. The method according to claim 9, wherein a message for establishing and releasing the virtual connections is broadcast by at least each processor to all of the concentrators in the network, said broadcast message enabling a screening of calls.

* * * * *